US009113620B2

(12) United States Patent
Rogers

(10) Patent No.: US 9,113,620 B2

(45) Date of Patent: Aug. 25, 2015

(54) FISHING ROD HOLDER WITH FISHING MOTION CAPABILITY

(71) Applicant: Douglas Rogers, Northern Cambri, PA (US)

(72) Inventor: Douglas Rogers, Northern Cambri, PA (US)

( * ) Notice: Subject to any disclaimer, the term of this patent is extended or adjusted under 35 U.S.C. 154(b) by 0 days.

(21) Appl. No.: 13/744,809

(22) Filed: Jan. 18, 2013

(65) Prior Publication Data

US 2014/0202062 A1 Jul. 24, 2014

(51) Int. Cl.

*A01K 97/10* (2006.01)
*A01K 97/11* (2006.01)
*A01K 97/22* (2006.01)

(52) U.S. Cl.

CPC ................. *A01K 97/11* (2013.01); *A01K 97/10* (2013.01); *A01K 97/22* (2013.01)

(58) Field of Classification Search

CPC ....... A01K 97/10; A01K 91/10; A01K 97/08; A01K 97/01; A45F 5/00; A45F 2200/0566

USPC ............. 43/15, 16, 21.2, 26.1; 248/511, 534, 248/538, 629

See application file for complete search history.

(56) References Cited

U.S. PATENT DOCUMENTS

| | | | |
|---|---|---|---|
| 3,410,015 A * | 11/1968 | Garcia, Jr | 43/15 |
| 3,456,377 A * | 7/1969 | Niles | 43/15 |
| 5,115,593 A * | 5/1992 | Keough | 43/43.12 |
| 5,992,081 A * | 11/1999 | Elkins | 43/21.2 |
| 6,094,851 A * | 8/2000 | Guidry | 43/15 |
| 6,336,287 B1 * | 1/2002 | Lobato | 43/16 |
| 6,430,864 B1 * | 8/2002 | Thomure et al. | 43/15 |
| 6,446,379 B1 * | 9/2002 | James | 43/17 |
| 6,594,940 B1 * | 7/2003 | Dobmeier | 43/15 |
| 6,684,555 B1 * | 2/2004 | Vela | 43/15 |
| 2010/0095579 A1 * | 4/2010 | Cabrera et al. | 43/15 |

* cited by examiner

*Primary Examiner* — David Parsley
*Assistant Examiner* — George Andonyan

(57) ABSTRACT

A fishing rod holder having a spring base, rod receiver, at least one rod receiver arm and a first spring. The spring base being mountable to a secure mount. The rod receiver including a top and bottom, and an open area within the rod receiver at the top to receive a fishing rod. The at least one rod receiver arm connecting the rod receiver to the spring base, wherein the rod receiver is connected by the at least one rod receiver to the spring base such that the rod receiver can pivot to provide motion during fishing. The first spring mounted between the spring base and the rod receiver to provide resistance to movement of the rod receiver.

12 Claims, 31 Drawing Sheets

10 12 10 20 24 18 16 30 22 12 28 28 34 14 30 16 75 68 18

72
68
70
74
18

68
70
60
18

68
18
75

77
76

78
10
10
86
88
94
92
96
90

118
120
134
104
128
102
98

118
120
134
104
102
98

118
120
148
122
122
120
106
38
40
40
42
42
22

104
22
118
106

118
24
150
156

164
164
166
168

FISHING ROD HOLDER WITH FISHING MOTION CAPABILITY

BACKGROUND

The present invention relates generally to the field of fishing. More specifically, the present invention relates to fishing aids.

There are many fishing aids on the market to help the user catch fish. The sport of fishing with a fishing rod while on lakes and out on the ocean are enjoyed by many people. For some users, it is difficult to fight a fish caught on a fishing line because of the strength required. This is especially true for someone who has lost an arm. There is nothing on the market to aid people of lesser strength or who have lost a limb fight a fish as it is reeled in.

It is an object of the present invention to provide a fishing aid to aid people of lesser strength or who have lost a limb fight a fish as it is reeled in.

SUMMARY OF INVENTION

A fishing rod holder having a spring base, rod receiver, at least one rod receiver arm and a first spring. The spring base being mountable to a secure mount. The rod receiver including a top and bottom, and an open area within the rod receiver at the top to receive a fishing rod. The at least one rod receiver arm connecting the rod receiver to the spring base, wherein the rod receiver is connected by the at least one rod receiver to the spring base such that the rod receiver can pivot to provide motion during fishing. The first spring mounted between the spring base and the rod receiver to provide resistance to movement of the rod receiver.

DETAILED DESCRIPTION OF THE INVENTION

Figure 1:
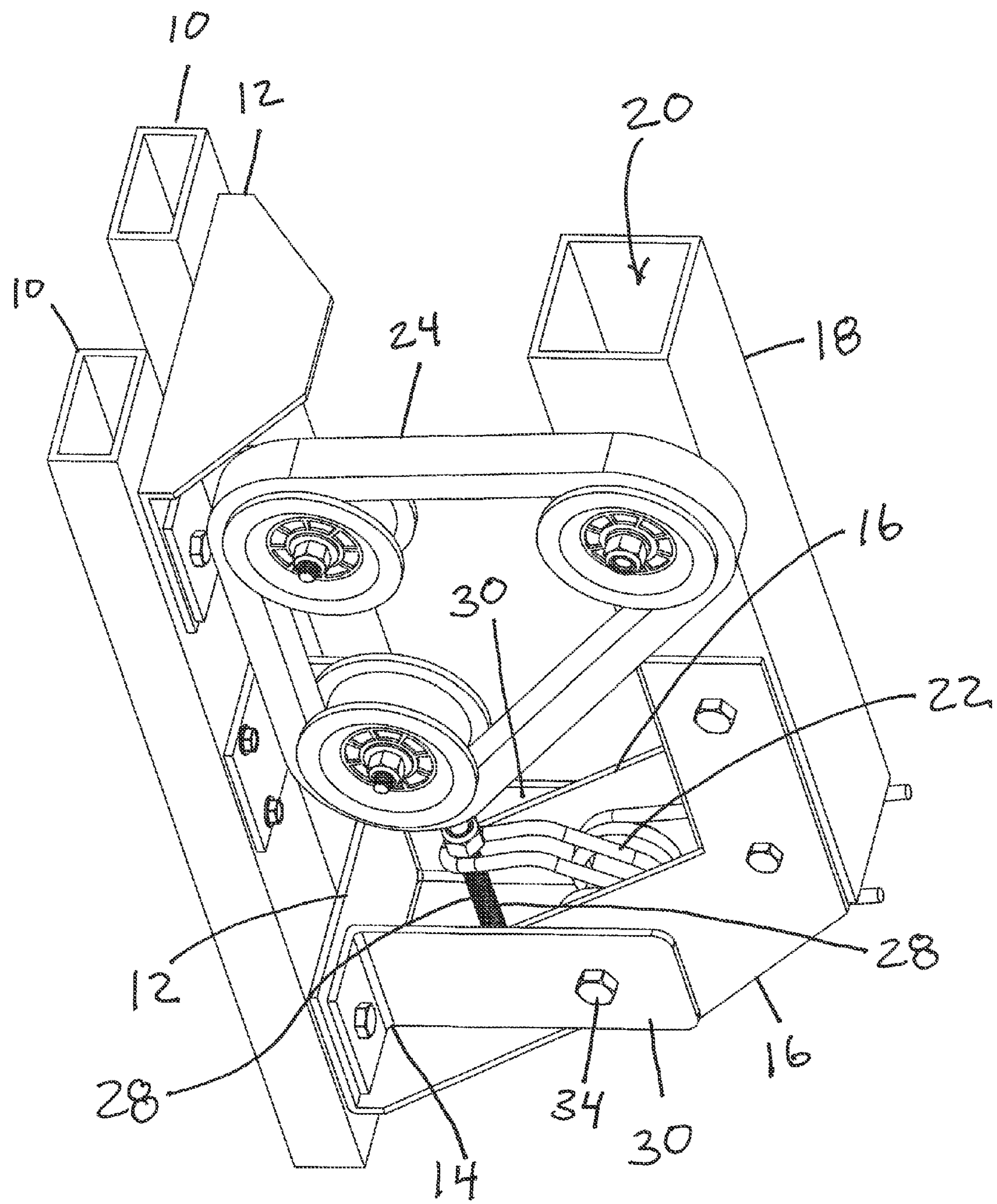
FIG. 1 is a perspective view of a first embodiment according to the present invention.
Figure 2:
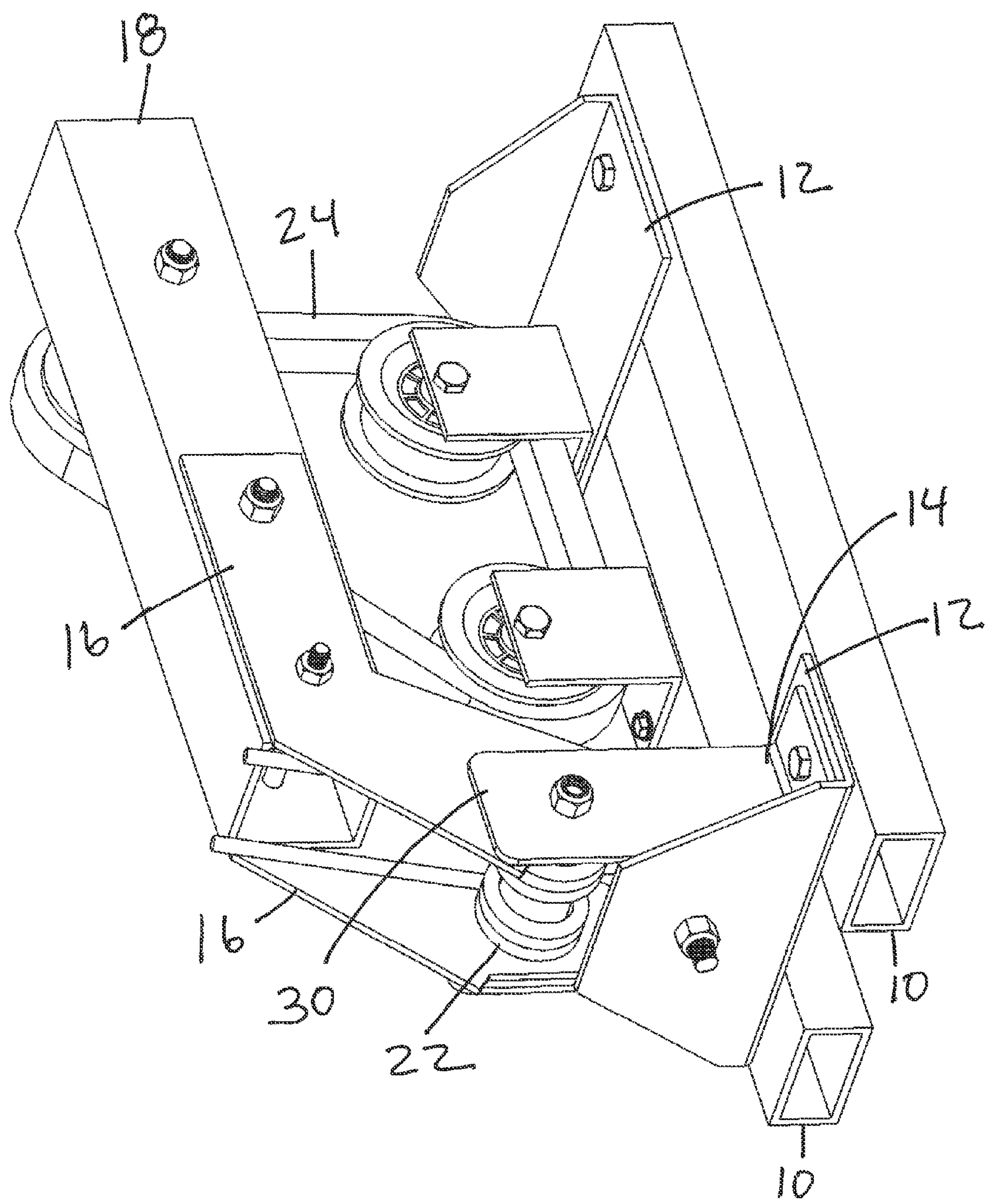
FIG. 2 is a perspective view of a first embodiment according to the present invention.

The present invention is a fishing rod holder, which allows for motion during fishing. The present invention is especially useful to people fishing who only have the use of one interconnected arm and hand. FIGS. 1-20 show a first embodiment and FIGS. 21-32 show a second embodiment. The two embodiments are shown as examples, but components of one embodiment can be used with another to form further embodiments. FIGS. 1-4 show the fishing rod holder connected to a mounting base made up of two columns 10. The fishing rod holder of FIGS. 1-4 includes two cross braces 12 which provide a support system for the mounting base. FIGS. 1-8 show the main framework of the fishing rod holder. FIG. 5 shows the fishing rod holder including a spring base 14, two rod receiver arms 16, and a rod receiver 18. The rod receiver 18 includes an opening 20 to receive a fishing rod or a rod holder. The fishing rod holder also includes a motion system. The motion system includes a spring 22, elastic band 24 acting as a second spring and pulleys. The spring base 14 is shown bolted to the mounting base at one of the cross braces 12 for strength. The spring base 14 is shown as an open U-shaped channel to receive the spring 22. The bottom of the U-shaped channel includes a bolt hole 26 for a spring retention bolt 28. The spring base 14 includes spring base arms 30 that extend from the open U-shaped channel. Each spring base arm 30 includes a bolt hole 32 to receive an axle bolt 34. Each rod receiver arm 16 is shown fastened to the rod receiver 18. Each rod receiver arm 16 includes a bolt hole 36 to receive the axle bolt 34.

Figure 4:
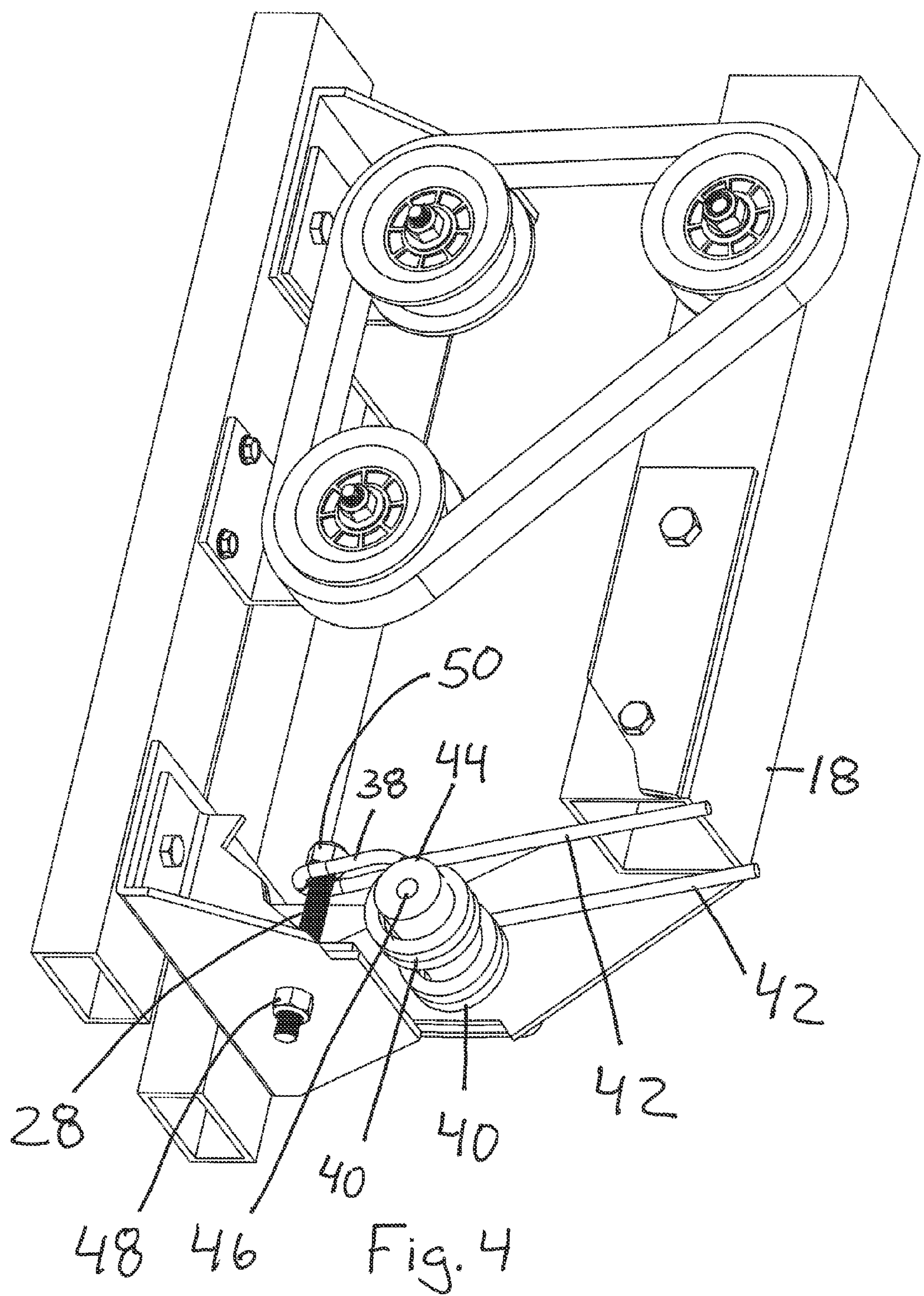
FIG. 4 is a perspective view of a first embodiment according to the present invention.
Figure 5:
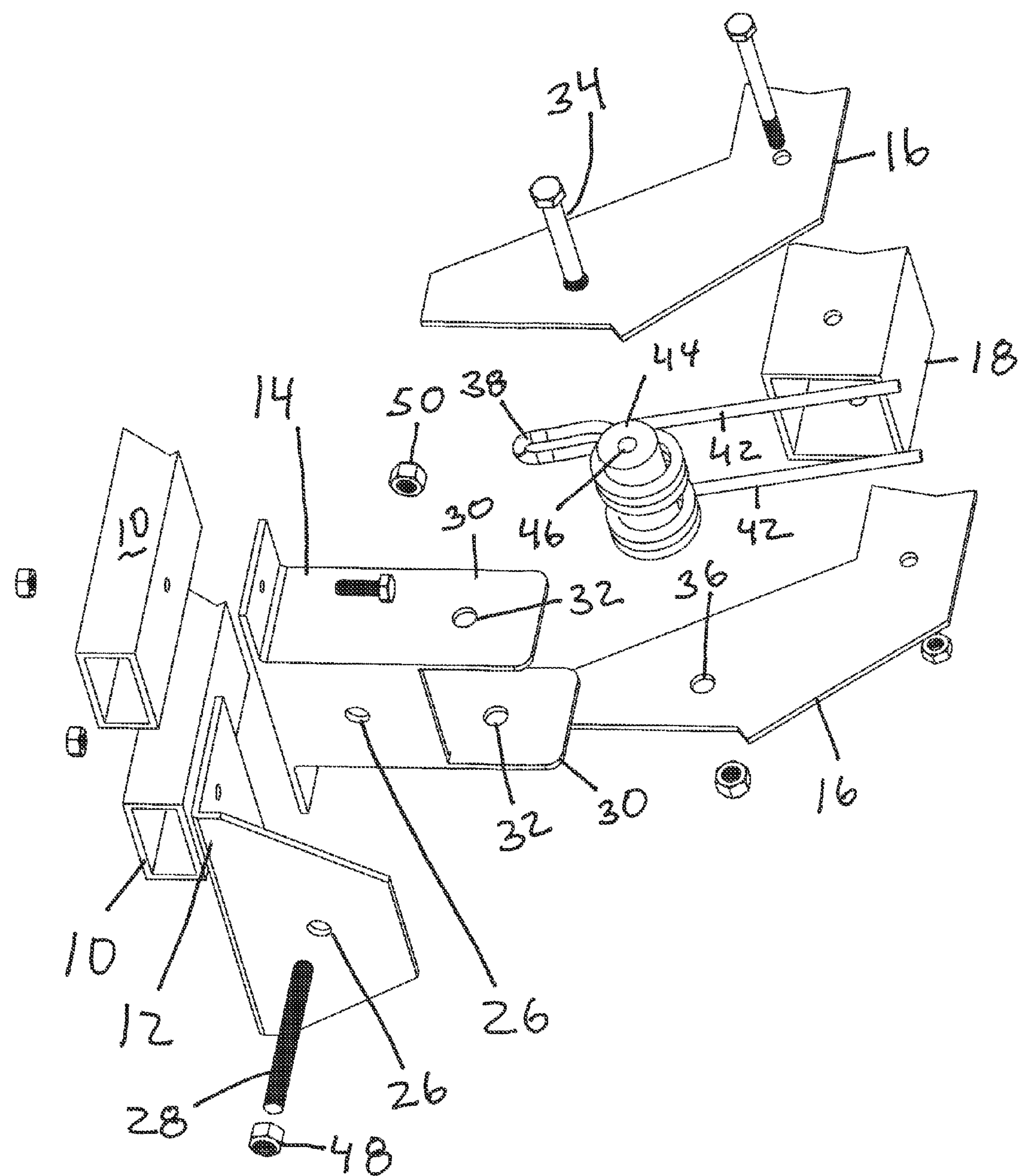
FIG. 5 is an exploded perspective view of a first embodiment according to the present invention.
Figure 6:
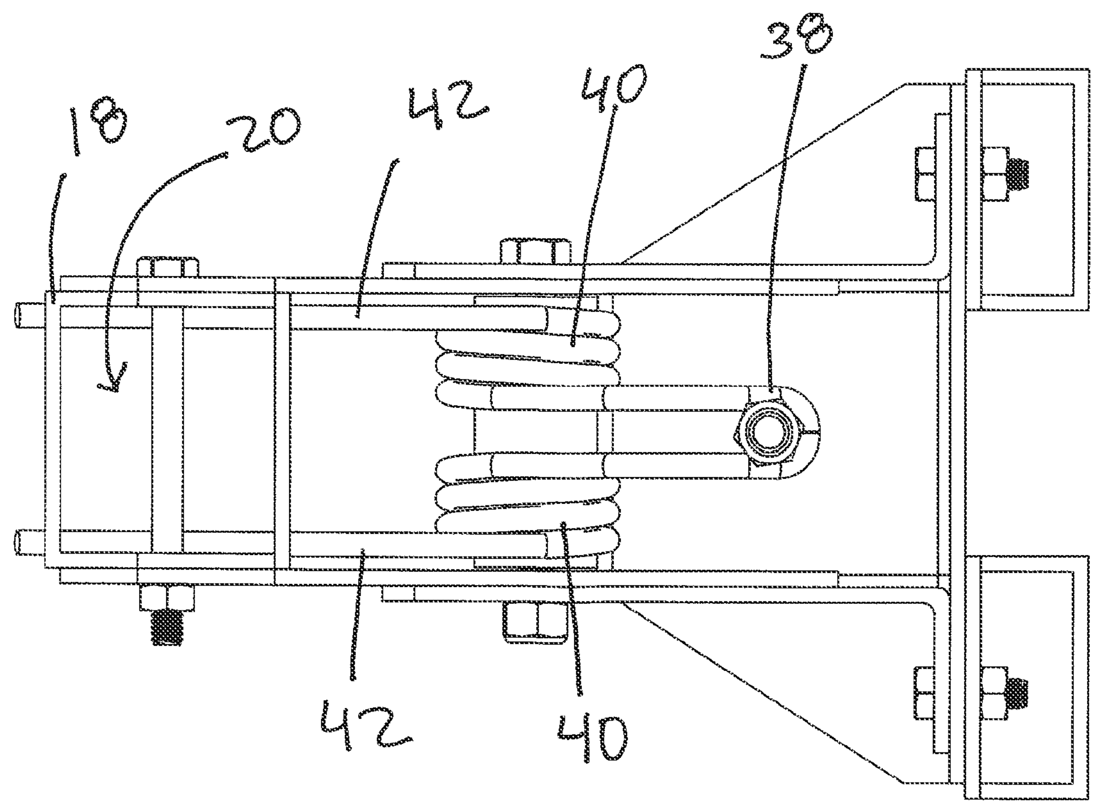
FIG. 6 is a top view of a first embodiment according to the present invention.
Figure 7:
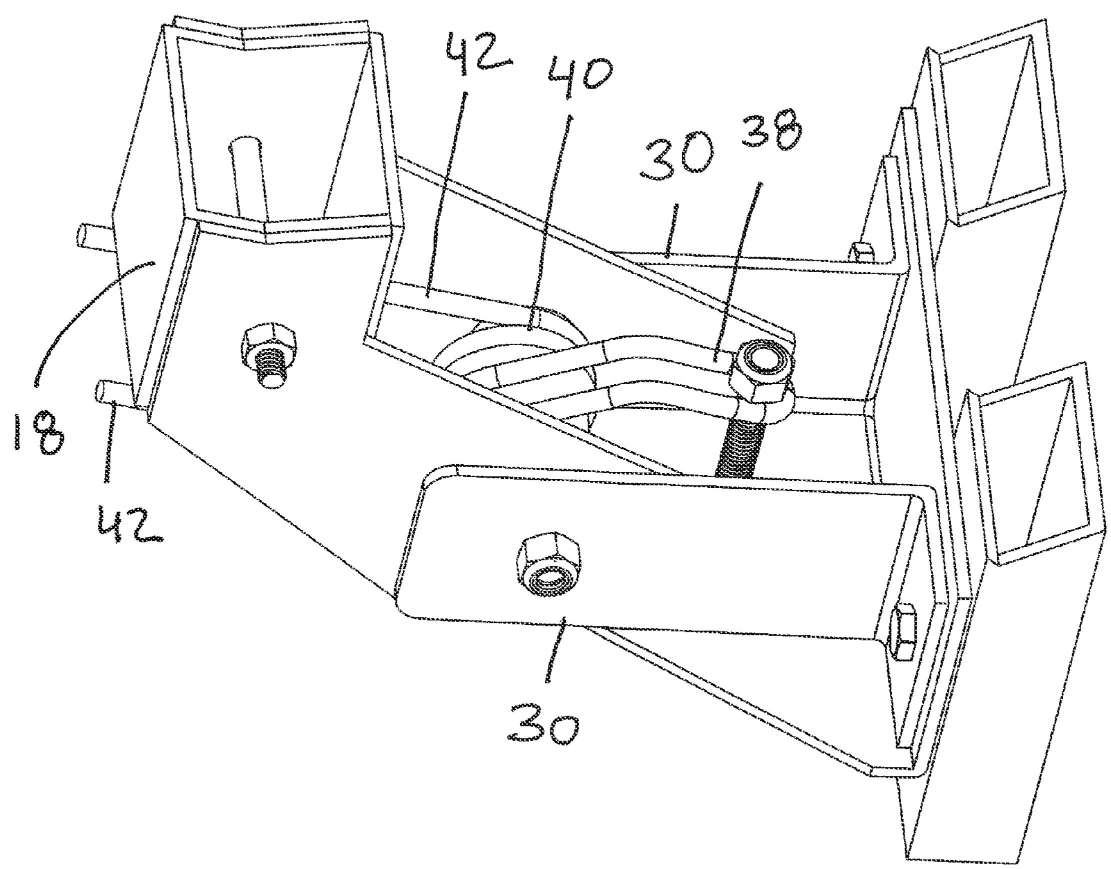
FIG. 7 is a perspective view of a first embodiment according to the present invention.
Figure 8:
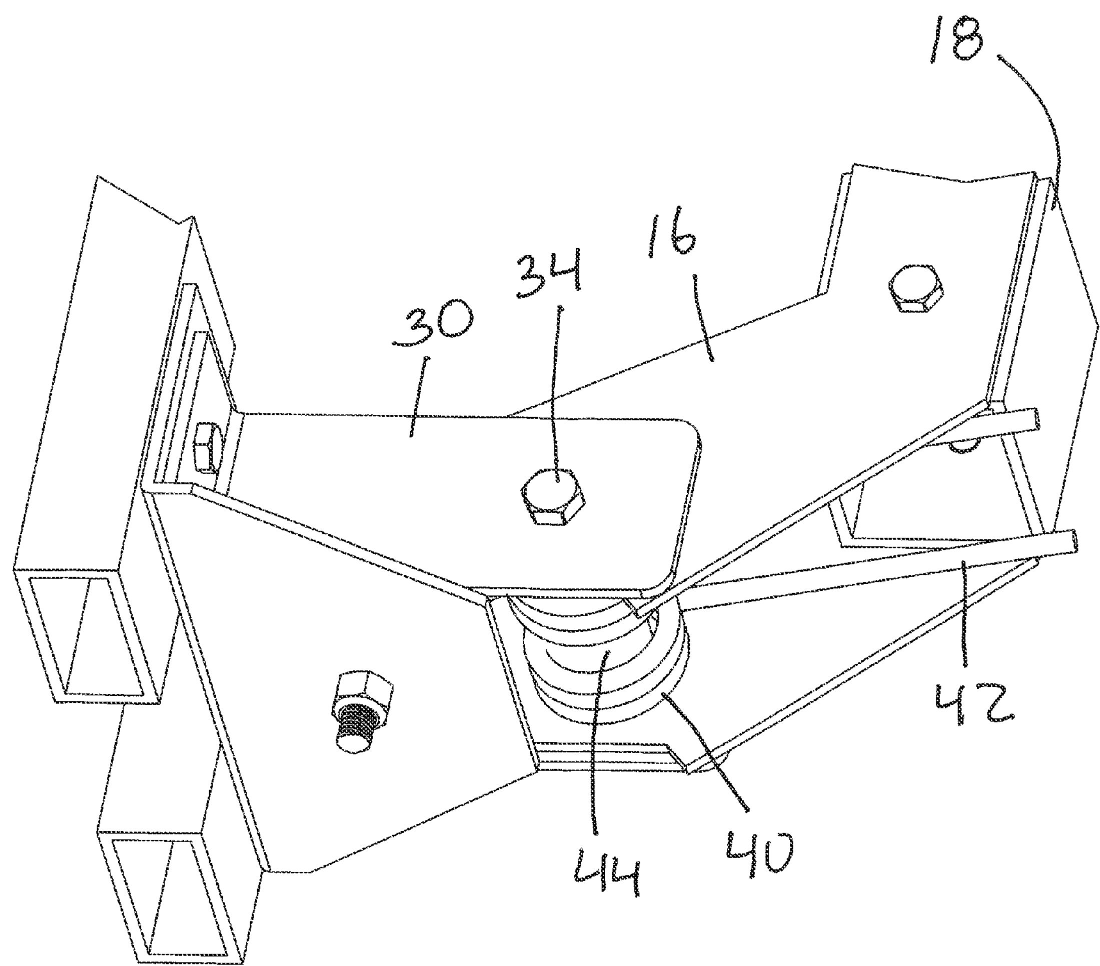
FIG. 8 is a perspective view of a first embodiment according to the present invention.

FIGS. 4-5 shows the spring 22 having a U-shaped loop 38 that extends out into two coils 40, where a leg 42 extends out from each coil 40. An axle 44 is inserted within the coils 40 to support the spring 22. The axle 44 includes a bolt channel 46 to receive the axle bolt 34. The axle bolt 34 is used to attach the rod receiver arms 30 to the spring base 14 so that the rod receiver arms 30 can pivot at the spring base 14, while the axle bolt 34 supports the spring 22 in position. The loop 38 is held in place using a the spring retention bolt 28 which passes thru the bolt hole 26 in the U-shaped channel and then extends through the loop 38. A bottom nut 48 and top nut 50 screws onto the ends of the spring retention bolt 28 to retain the loop 38 about the spring retention bolt 28, as shown in FIGS. 6-7. The two spring legs 42 extend under the bottom of the rod receiver 18 and apply upward pressure to the bottom of the rod receiver 18, as shown in FIG. 8. The amount of upward pressure is controlled by how far down the top nut 50 is rotated along the spring retention bolt 28.

Figure 3:
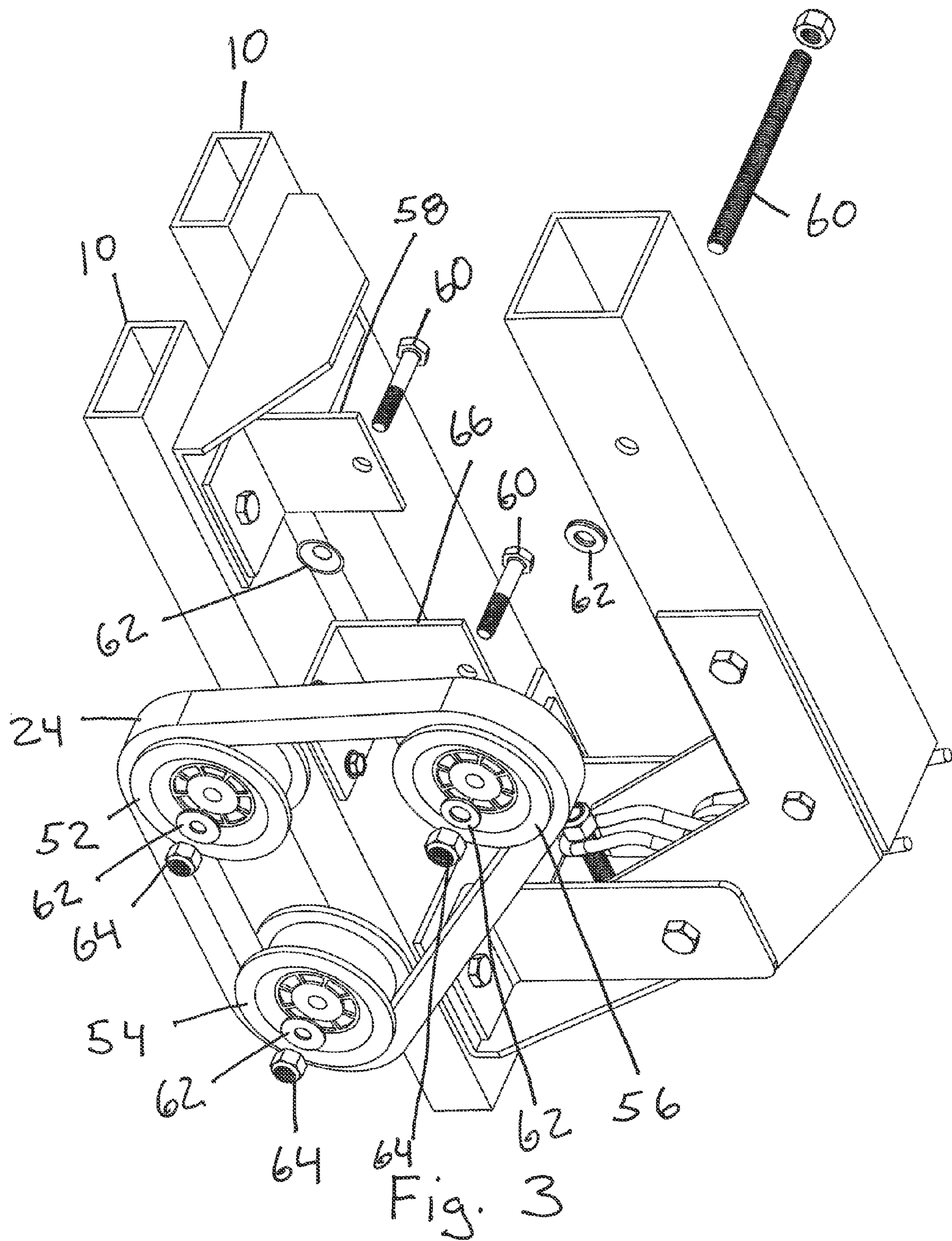
FIG. 3 is a perspective view of a first embodiment according to the present invention.

FIG. 3 shows an upper rear pulley 52, lower rear pulley 54 and a rod receiver pulley 56. The upper rear pulley 52 is shown mounted to an upper flange 58 using a pulley bolt 60 as an axle and two washers 62 and a nut 64 to retain the upper rear pulley 52 to the upper flange 58, as shown in FIG. 3. The lower rear pulley 54 is shown mounted to a lower flange 66 using a pulley bolt 60 as an axle and two washers 62 and a nut 64 to retain the lower rear pulley 54 to the lower flange 66. The rod receiver pulley 56 is shown mounted to the side of the rod receiver 18 using a pulley bolt 60 as an axle and two washers 62 and a nut 64 to retain the rod receiver pulley 56 to the rod receiver 18. The elastic band 24 is shown installed about the upper rear pulley 52, lower rear pulley 54 and the rod receiver pulley 56. The spring 22 and the elastic band 24 work together and simulate movement of the rod by a user, when reeling in a fish. The user can use the hand of one arm to turn the reel, while the fishing rod holder holds the rod like a second hand and arm. Therefore, users with only use of one hand and arm can use the fishing rod holder. The spring 22 retains the rod receiver 18 in position, while the elastic band 24 allows for movement, as the fish fights while hooked on the line.

Figure 9:
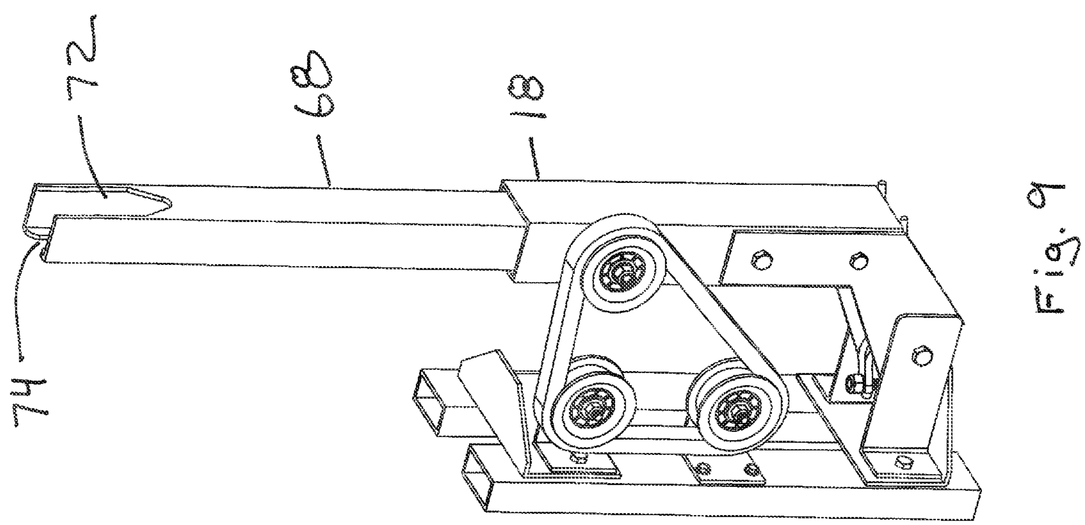
FIG. 9 is a perspective view of a first embodiment according to the present invention.
Figure 10:
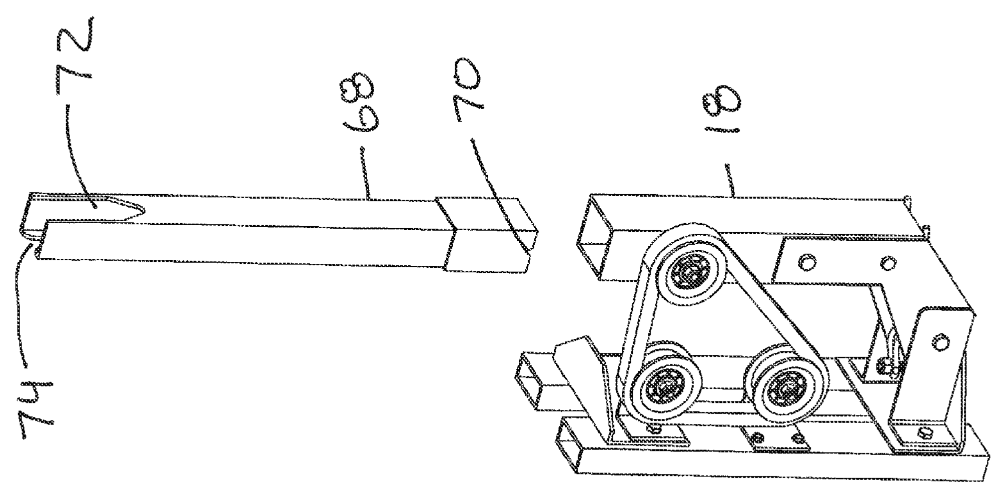
FIG. 10 is a perspective view of a first embodiment according to the present invention.
Figure 11:
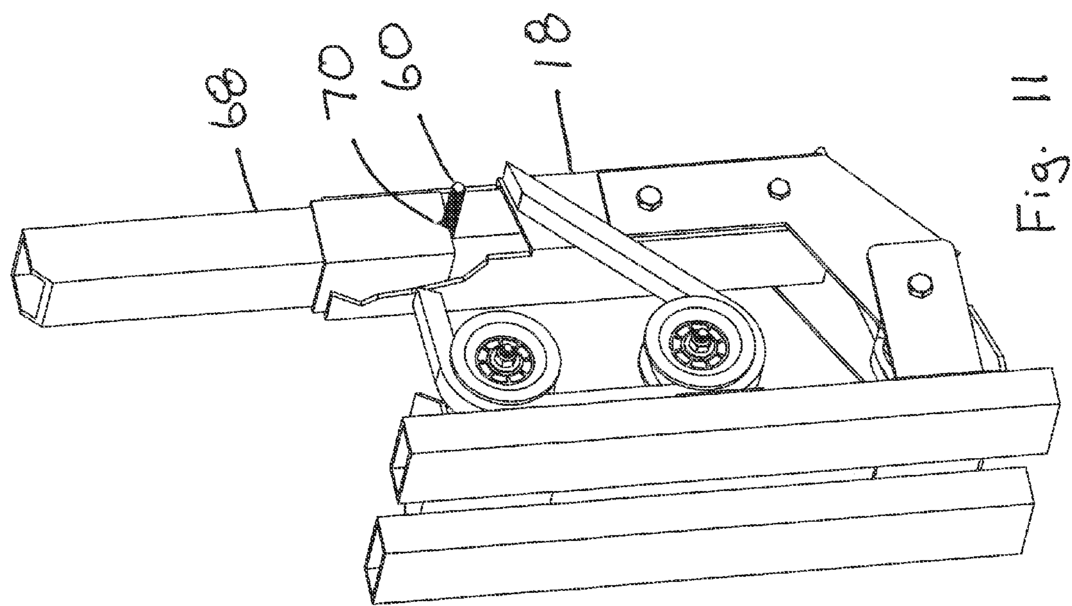
FIG. 11 is a perspective view of a first embodiment according to the present invention.

FIG. 9 shows a rod holder 68 which slides into the rod receiver 18. The rod holder 68 is used to secure a fishing rod in the rod receiver 18. FIG. 10 shows the rod holder 68 before insertion. The rod holder 68 includes a bolt notch 70 on the bottom of the rod holder 68. The pulley bolt 60 used with the rod receiver pulley 56 acts as a stop for the rod holder 68, as shown in FIG. 11. The pulley bolt 60 rests in the bolt notch 70. The rod holder 68 includes a front cutout 72 and a rear cutout 74 to allow parts of the spinner and rod clear as the handle of the rod is inserted into the rod holder 68.

Figure 12:
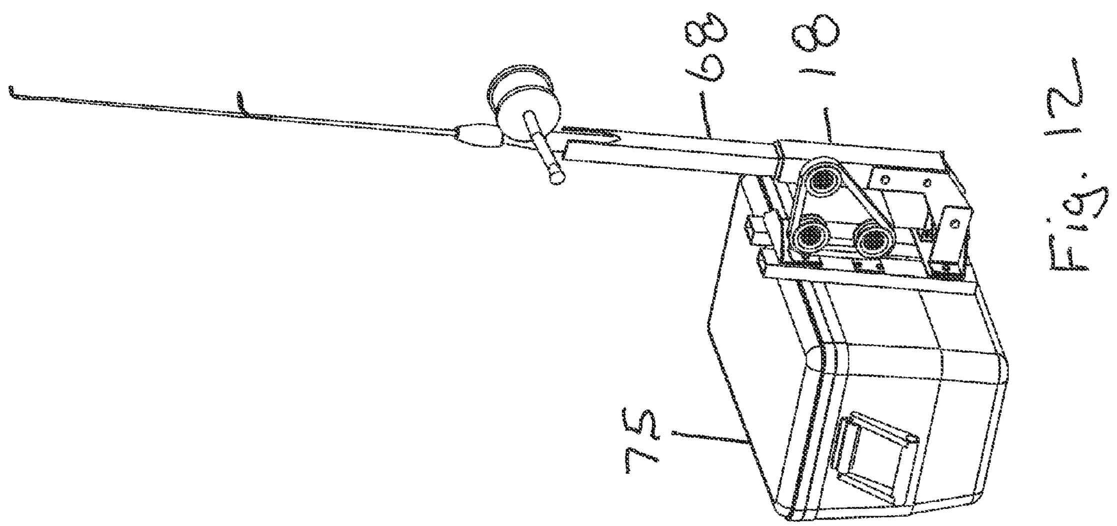
FIG. 12 is a perspective view of a first embodiment according to the present invention.
Figure 13:
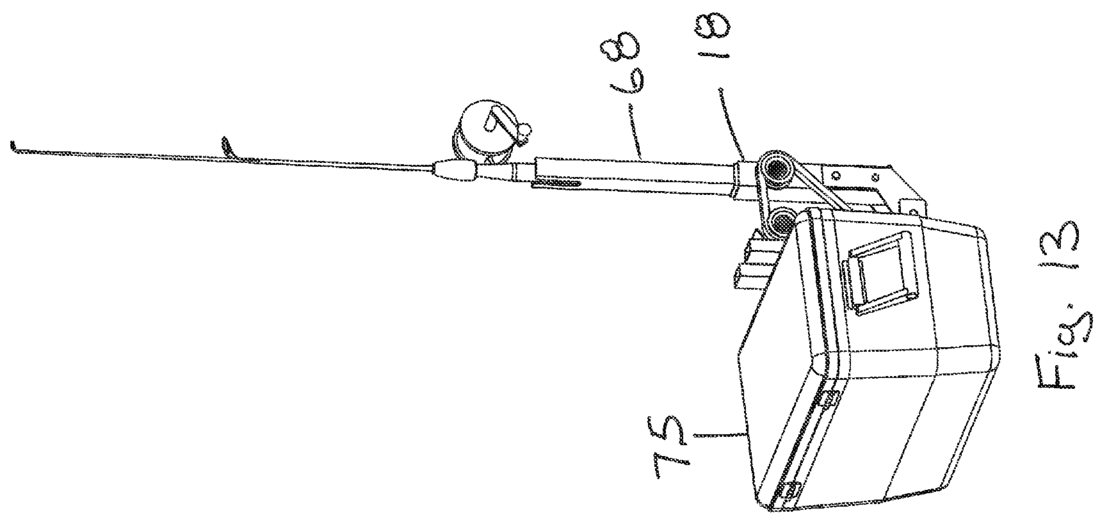
FIG. 13 is a perspective view of a first embodiment according to the present invention.
Figure 14:
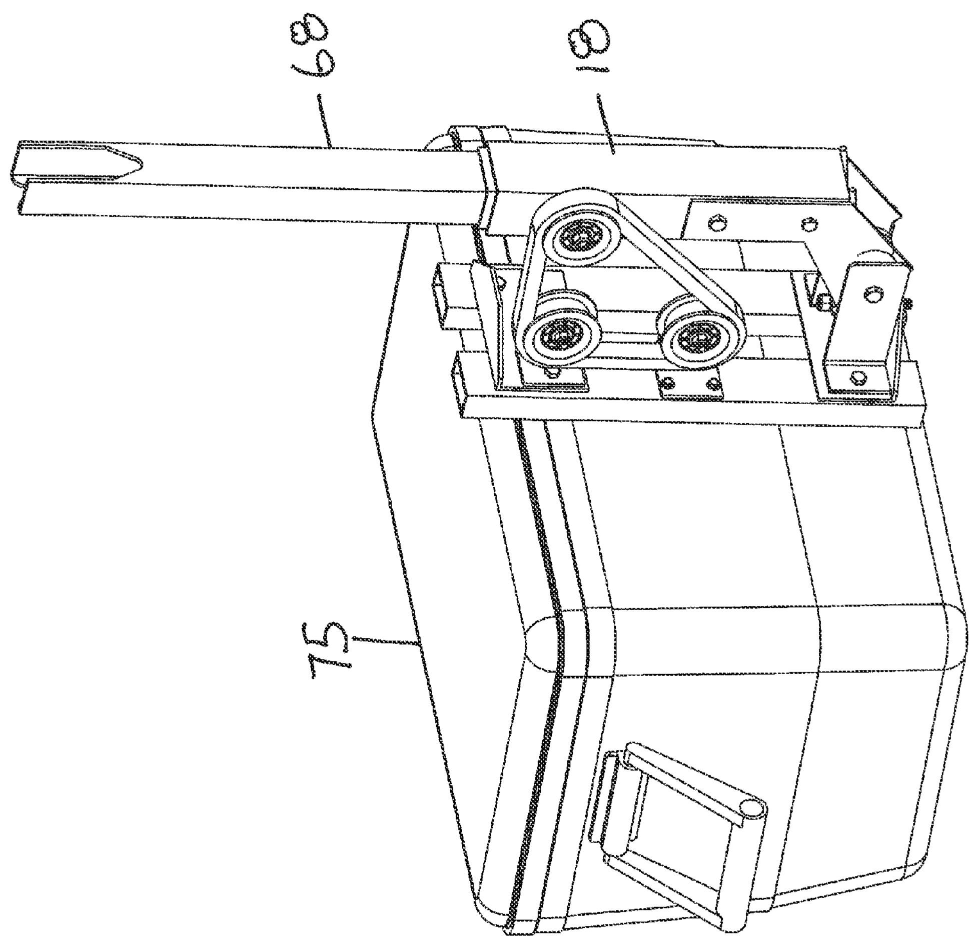
FIG. 14 is a perspective view of a first embodiment according to the present invention.
Figure 15:
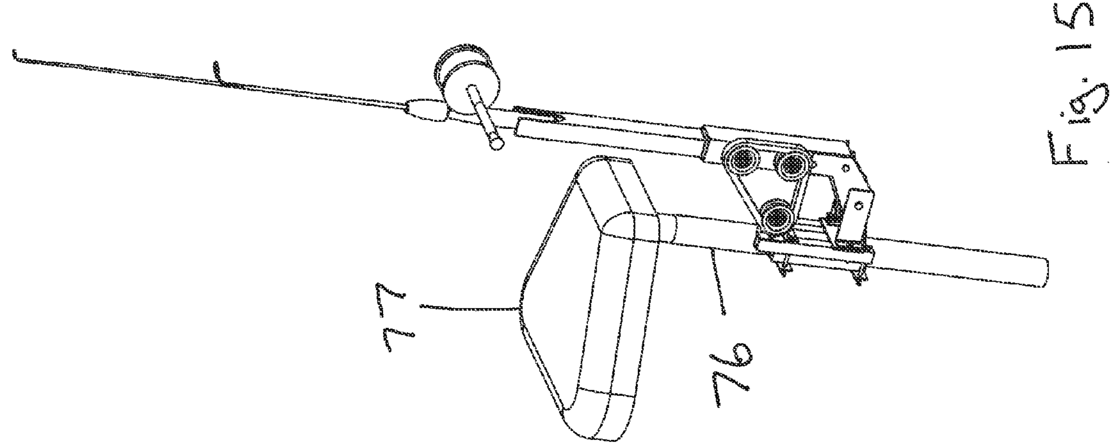
FIG. 15 is a perspective view of an alternative embodiment according to the present invention.
Figure 16:
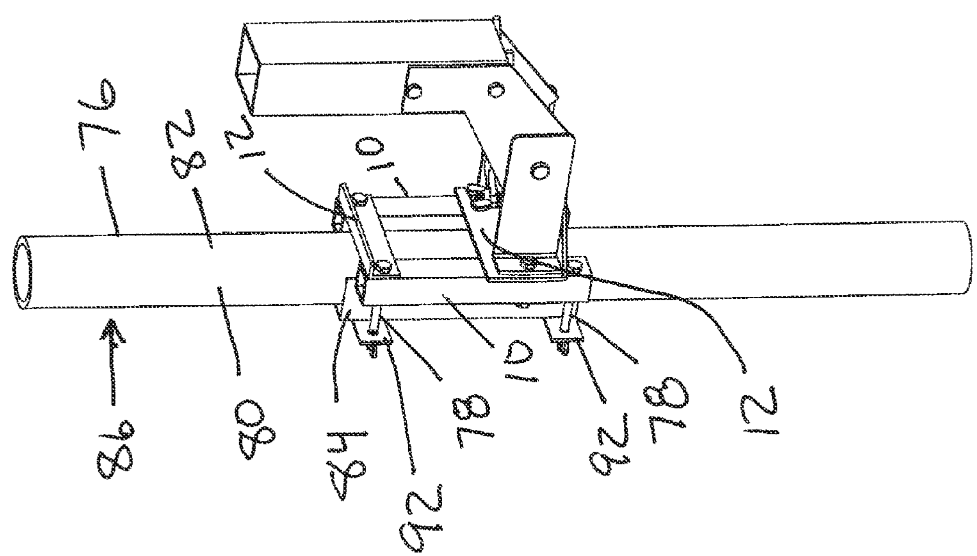
FIG. 16 is a perspective view of an alternative embodiment according to the present invention.
Figure 17:
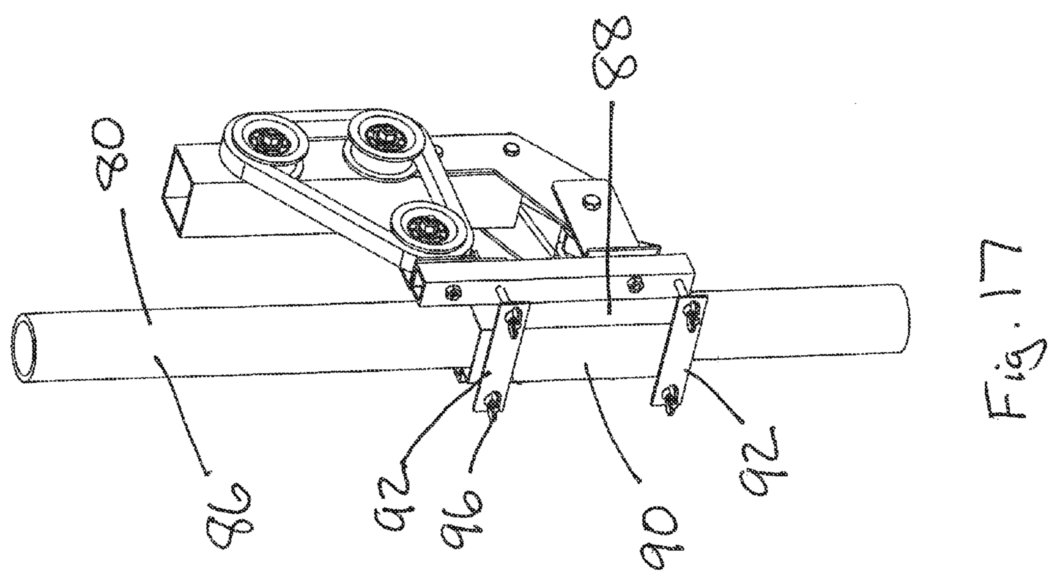
FIG. 17 is a perspective view of an alternative embodiment according to the present invention.
Figure 18:
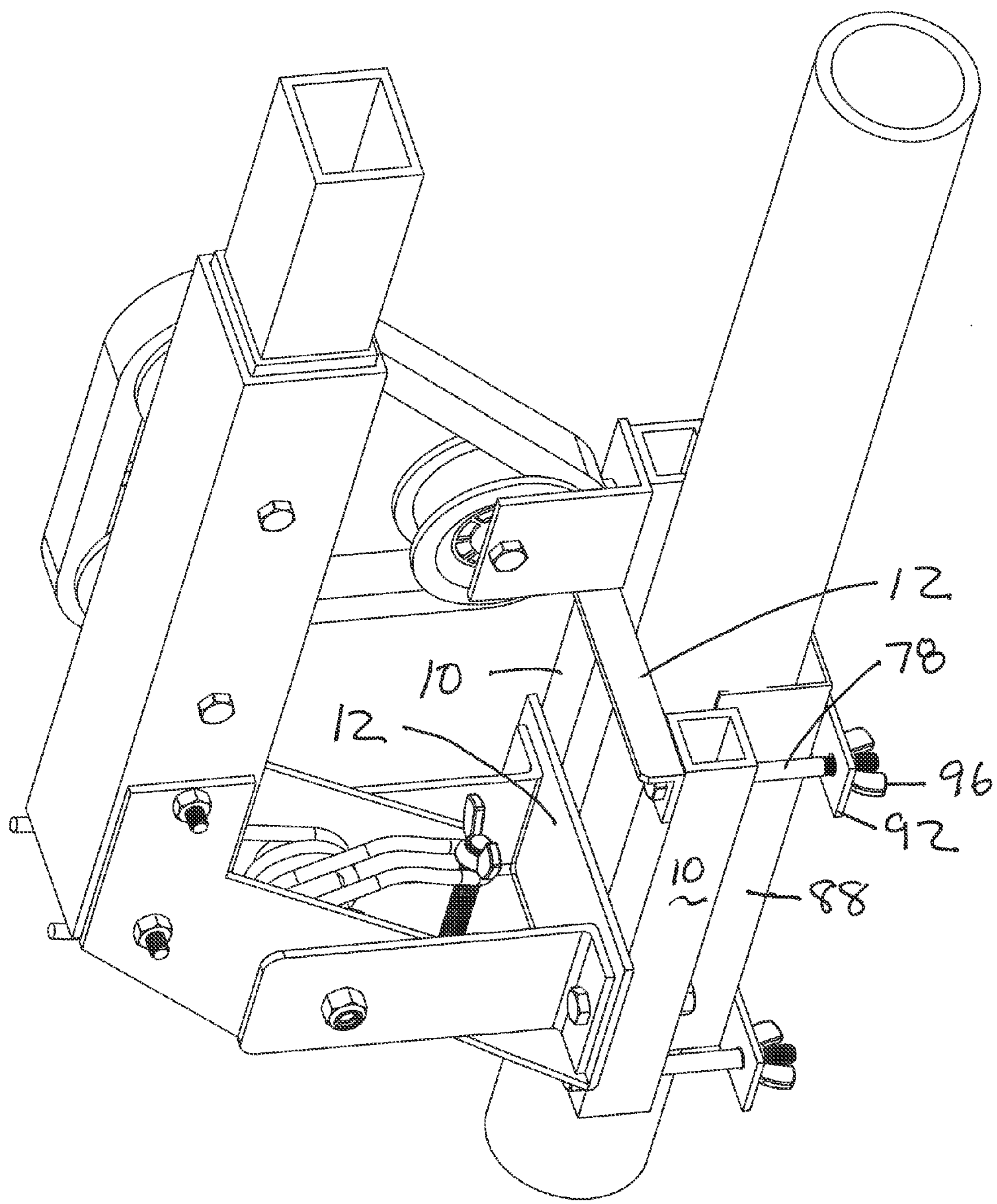
FIG. 18 is a perspective view of an alternative embodiment according to the present invention.
Figure 19:
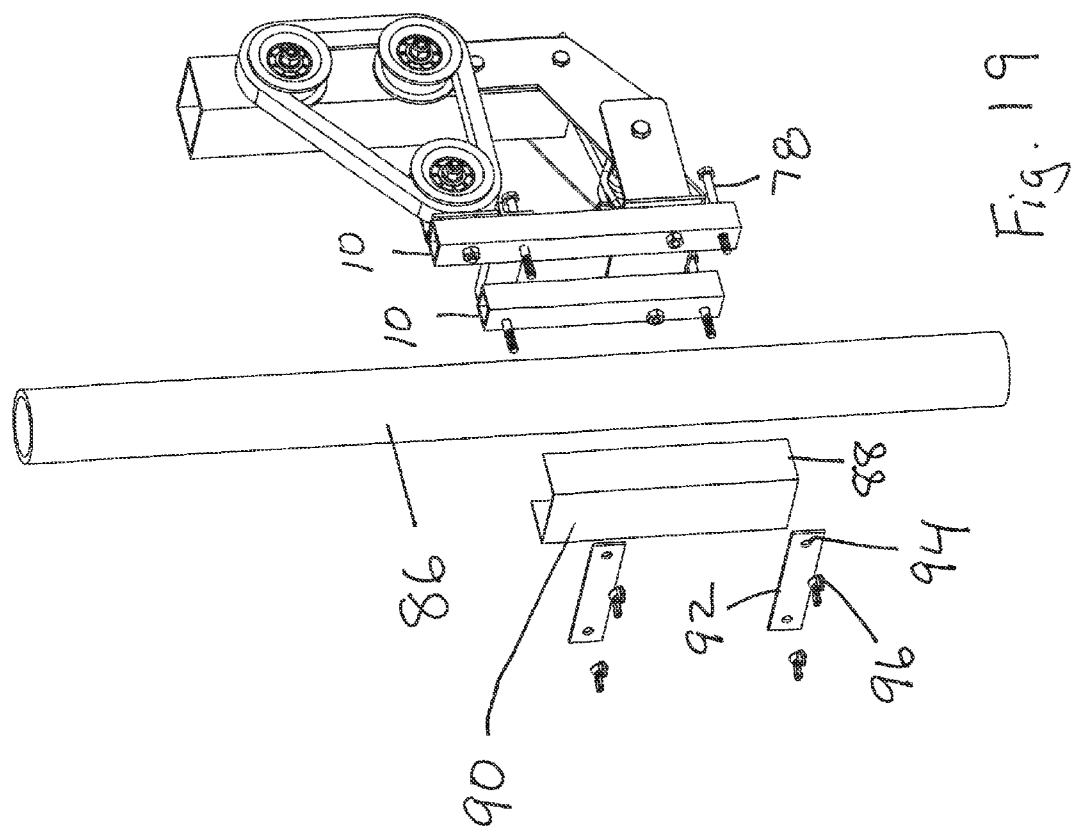
FIG. 19 is a perspective view of an alternative embodiment according to the present invention.
Figure 20:
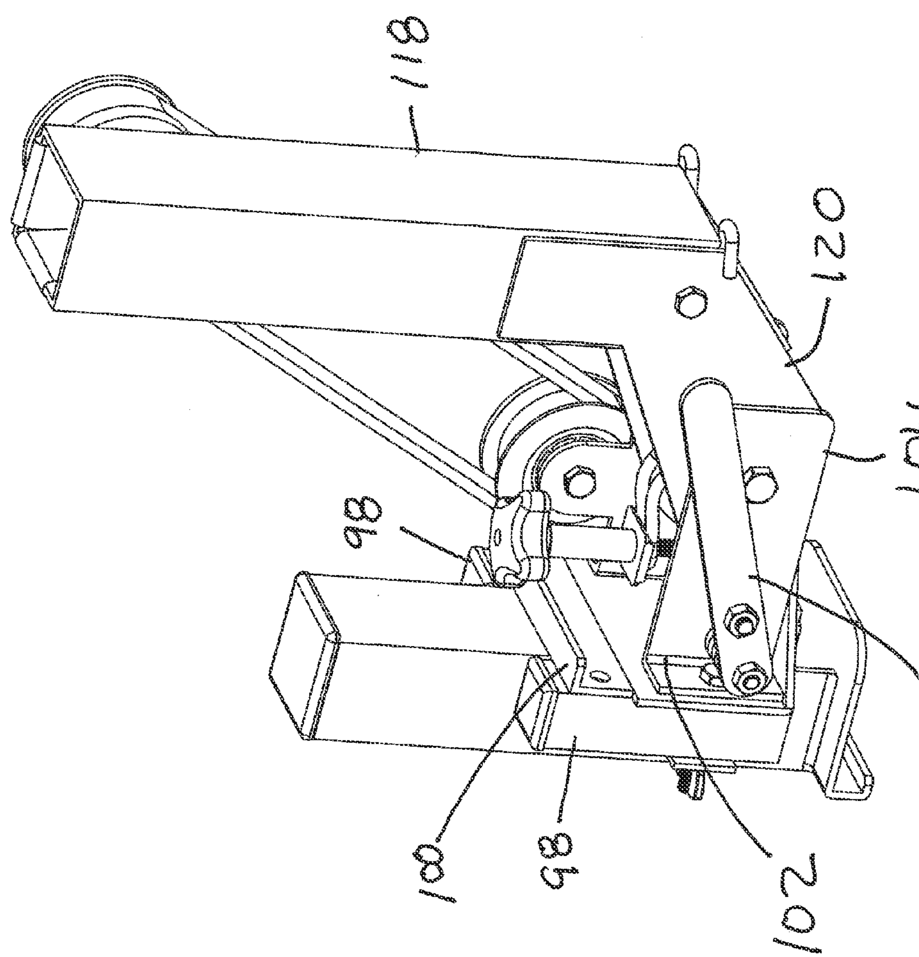
FIG. 20 is a perspective view of a second embodiment according to the present invention.

FIGS. 12-14 show the mounting base mounted to the side of a cooler 75. The cooler can be used as a seat by the user. The fishing rod holder as shown attached to the cooler can be operated by a user sitting on the cooler using one hand. FIGS. 15-19 show attachment of the fishing rod holder mounted to a boat fishing seat 77. Most seats used for fishing on a boat are a seat mounted to a post, where the post mounts into the deck floor of the boat. FIGS. 16-19 show close up view of the post 76 mounting of the fishing rod holder. The mounting base includes two back plate bolts 78 on each column 10 which past from front to rear. The columns 10 are spaced apart so that the columns 10 can pass by the sides 80 of the post 76 and the cross braces 12 can come against the front 82 of the post 76. An open side U-shaped channel column 84 fits around the rear 86 and sides 80 of the post 76. The U-shaped channel column 84 has flat sides 88 and a flat back 90. The flat back 90 provides more surface area to secure the fishing rod holder than the surface area of the round rear 86 of the post 76. Two back plates 92 including bolt holes 94 are used against the back of U-shaped channel column 84 to secure the mounting base to the post 76. Wing nuts 96 are shown with the back plate bolts 78 to secure the back plates 92 for ease of use.

Figure 21:
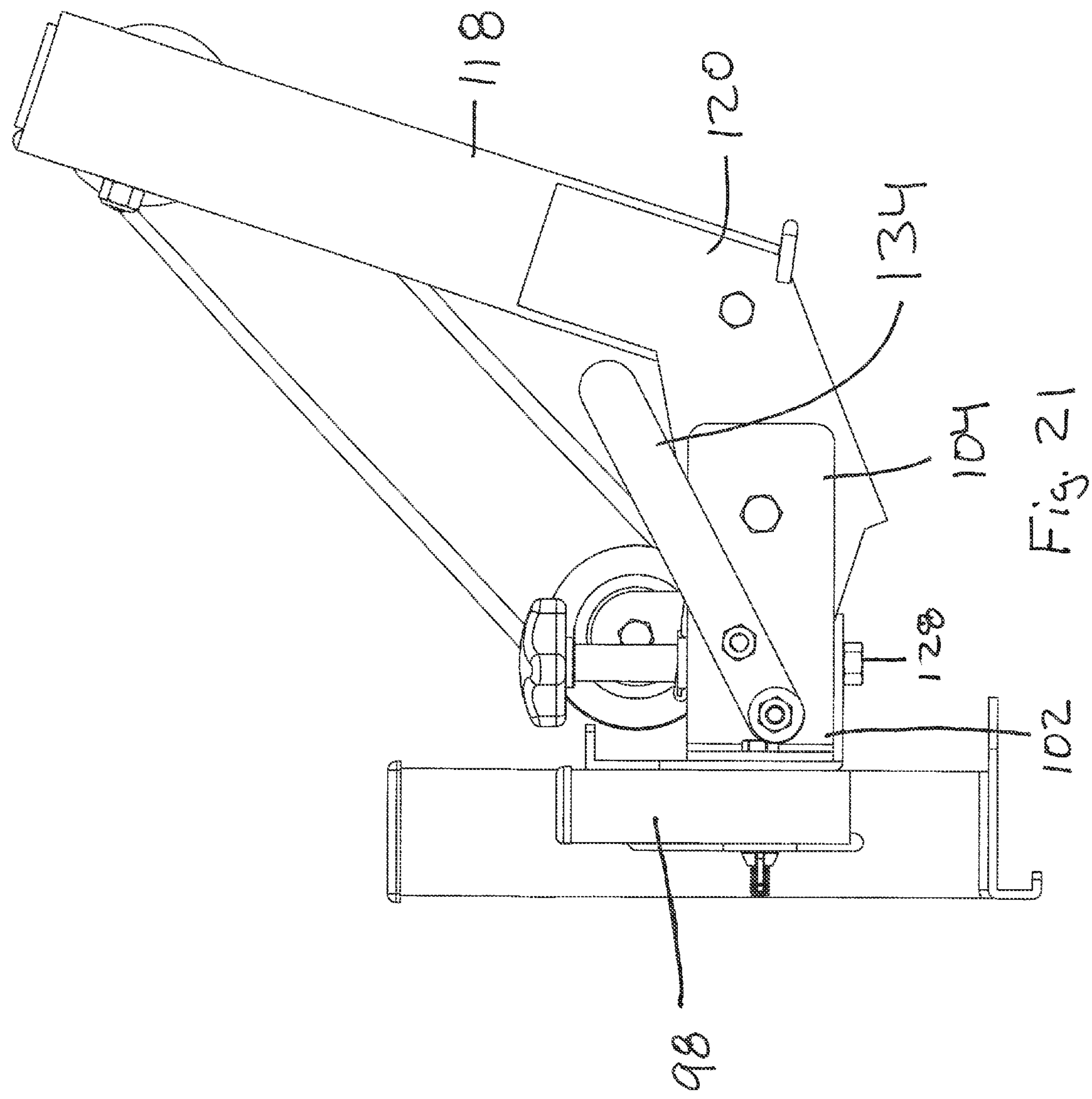
FIG. 21 is a perspective view of a second embodiment according to the present invention.
Figure 22:
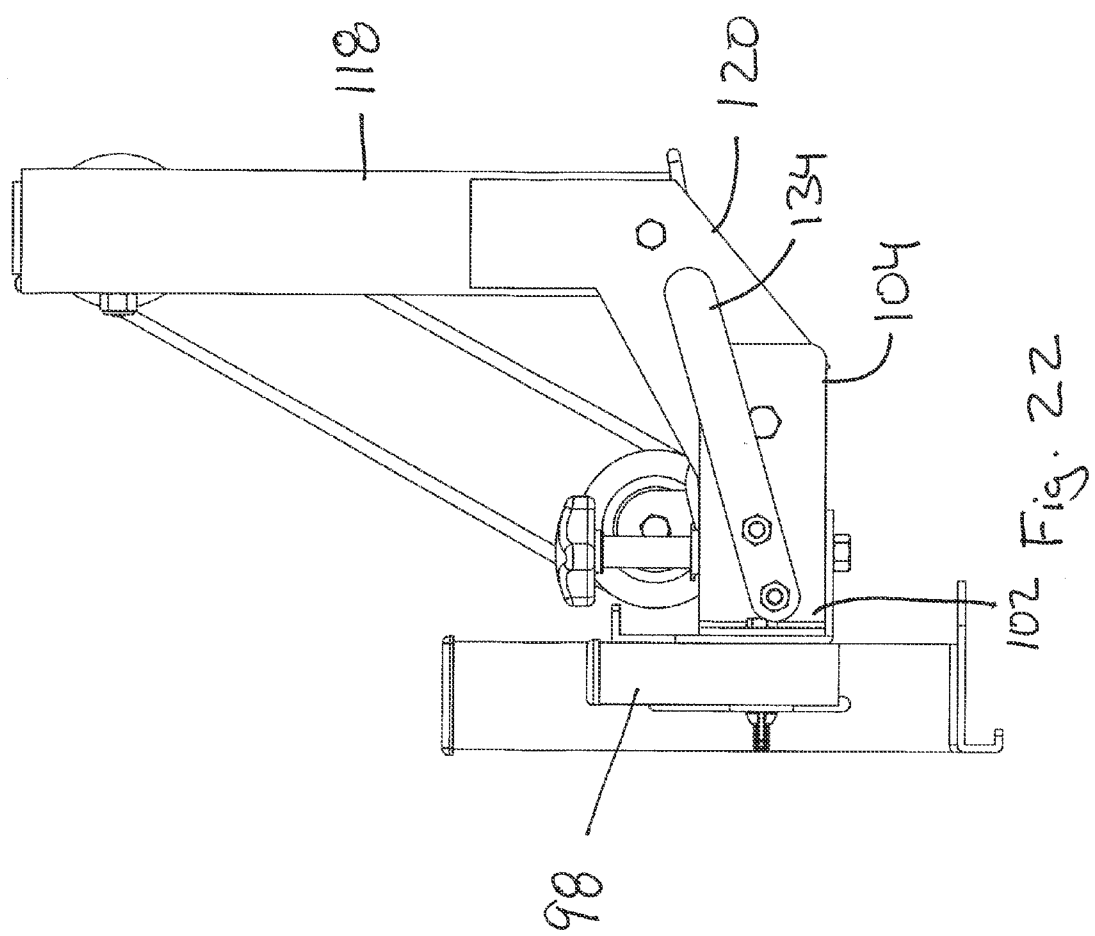
FIG. 22 is a side view of a second embodiment according to the present invention.
Figure 23:
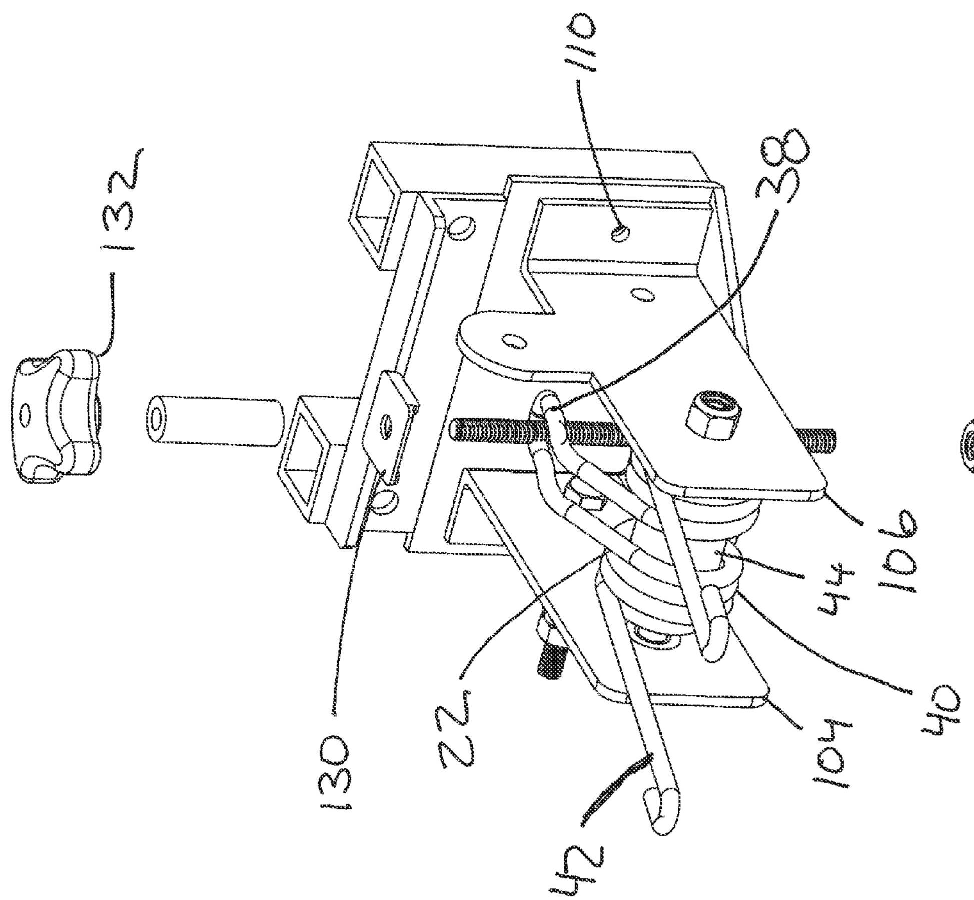
FIG. 23 is a side view of a second embodiment according to the present invention.
Figure 24:
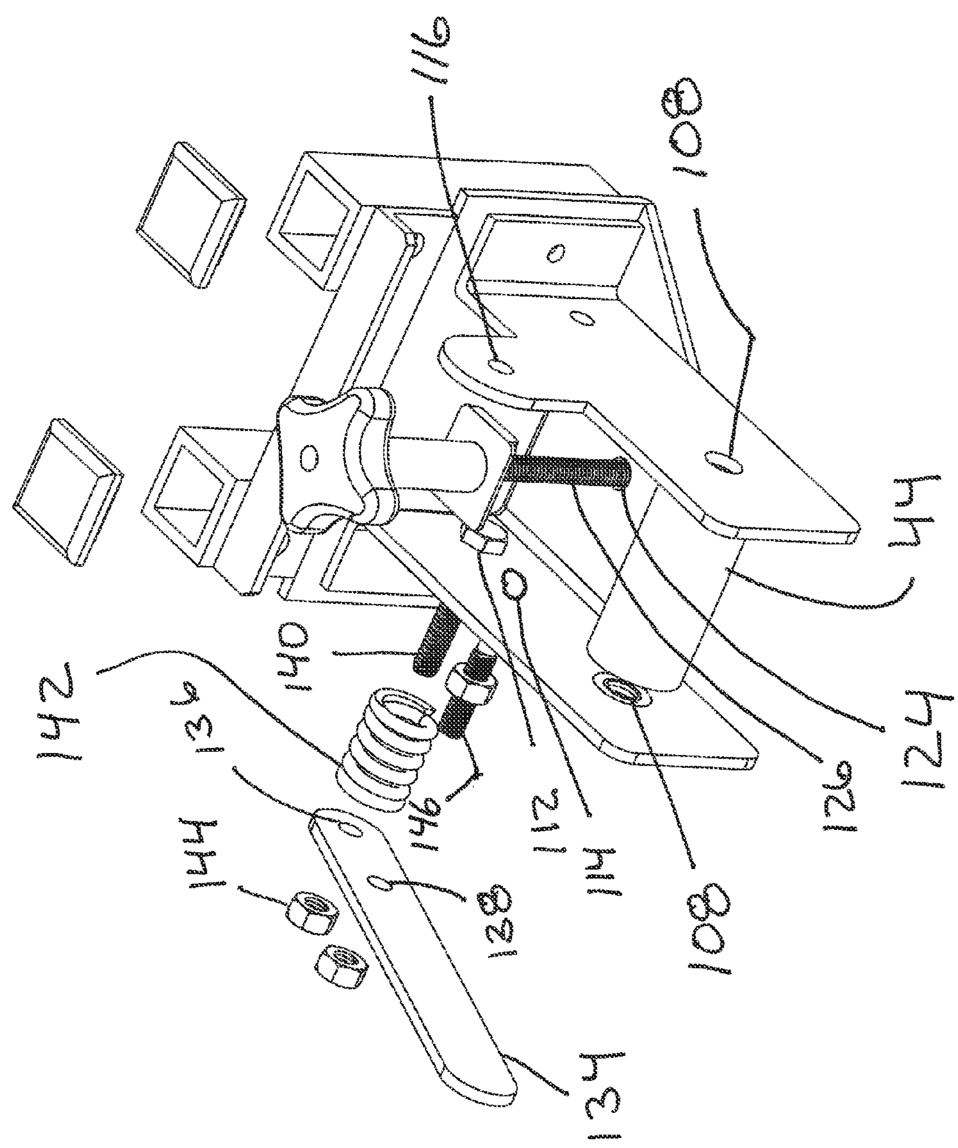
FIG. 24 is an exploded perspective view of a second embodiment according to the present invention.
Figure 25:
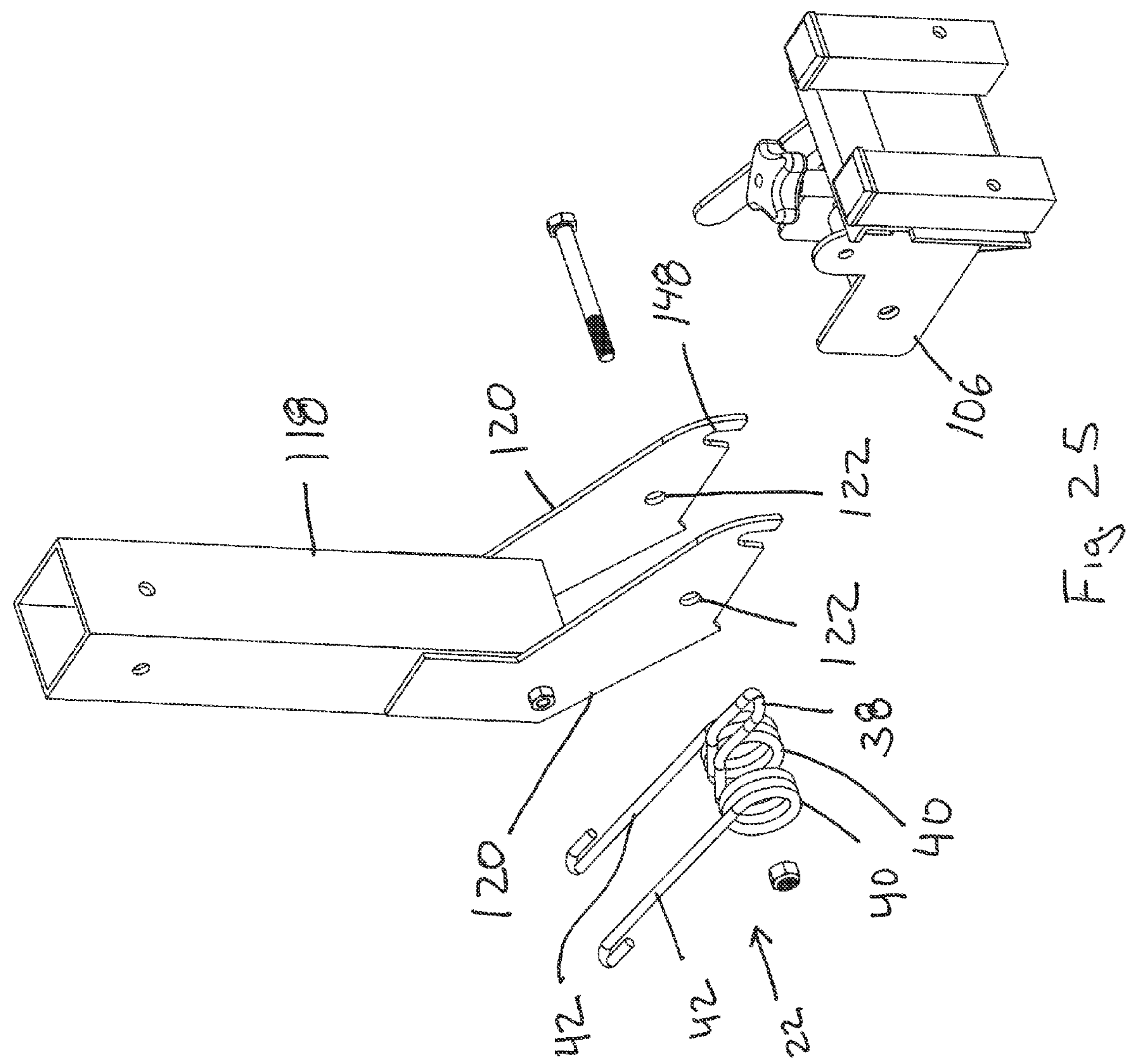
FIG. 25 is an exploded perspective view of a second embodiment according to the present invention.
Figure 26:
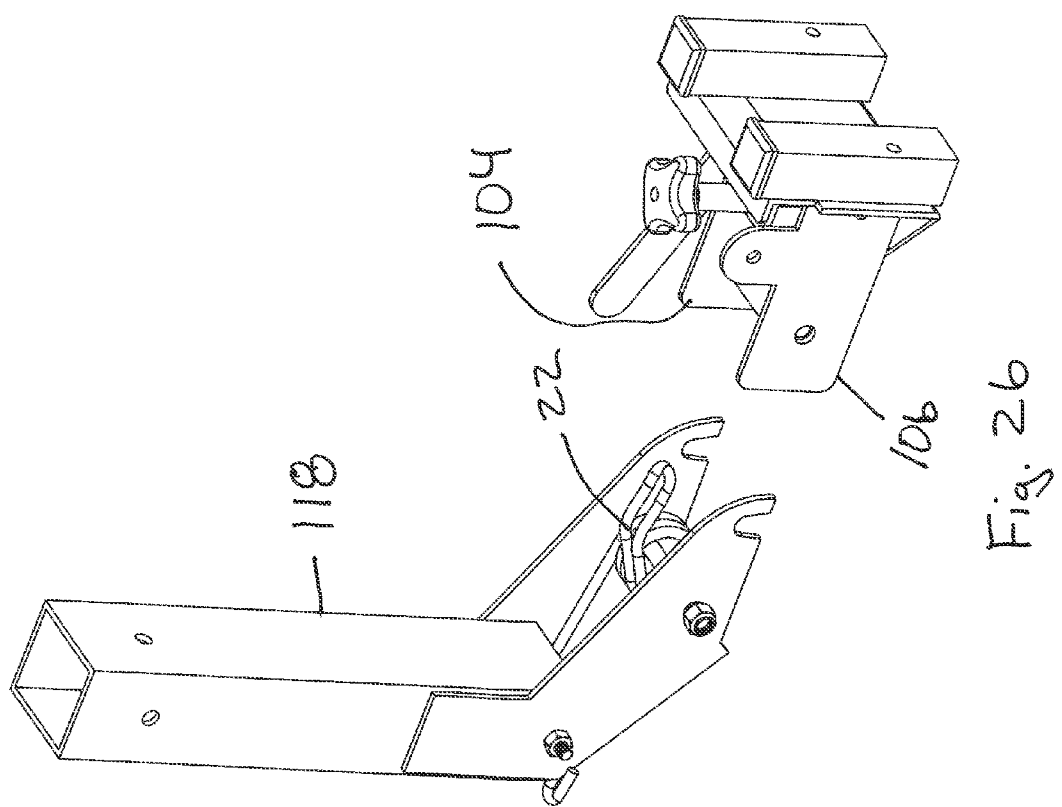
FIG. 26 is an exploded perspective view of a second embodiment according to the present invention.

FIGS. 20-31 show a second embodiment that is similar to the first embodiment. The fishing rod holder of FIGS. 20-31 includes a locking system. FIG. 21 shows the fishing rod holder in a locked configuration. FIG. 22 shows the fishing rod holder in an unlocked configuration. The fishing rod holder includes two columns 98, as shown in FIGS. 20-24. A cross brace 100 is used to connect the two columns 98 and together they provide the main support for all components of the fishing rod holder. A spring base 102 is shown that includes a first base arm 104 and a second base arm 106 that each extend outwards. Each base arm 104, 106 includes a spring axle bolt hole 108 and includes a mount bolt hole 110. The first base arm 104 includes a lever bolt hole 112 and a lock bolt hole 114. The second base arm 106 includes a pulley axle bolt hole 116. FIGS. 20-22 and 25-29 show a rod receiver 118 and two rod receiver arms 120 extending from the rod receiver 118 and in between the base arms 104, 106. The rod receiver arms 120 each include a spring axle bolt hole 122. The spring base 102 includes a spring bolt hole 124, as shown in FIG. 24. A spring bolt 126 extends up from the spring bolt hole 124 of the spring base 102 and is secured by nut 128 at the bottom, as shown in FIG. 23. The fishing rod holder includes a spring 22 having a U-shaped loop 38 that extends out into a two coils 40, where a leg 42 extends out from each coil 40. The spring bolt 126 extends up through the loop 38. A washer plate 130 is placed over the spring bolt 126 and rests on top of the loop 38. A threaded knob 132 is threaded on to the spring bolt 126 to secure the spring 22 at the loop 38. An axle 44 is inserted within the coils 40 of the spring 22 to support the spring 22. The axle 44 includes a bolt channel 46 to receive the axle bolt 34. The axle bolt 34 is used to attach the rod receiver arms 120 to the base arms 104, 106 so that the rod receiver arms 120 can rotate about the axle bolt 34, while the axle 44 supports the spring 22 in position. The two spring legs 42 extend under the bottom of the rod receiver 118 and apply upward pressure to the rod receiver 118. The threaded knob 132 is used to adjust the tension pressure of the spring 22 on the rod receiver 118.

Figure 27:
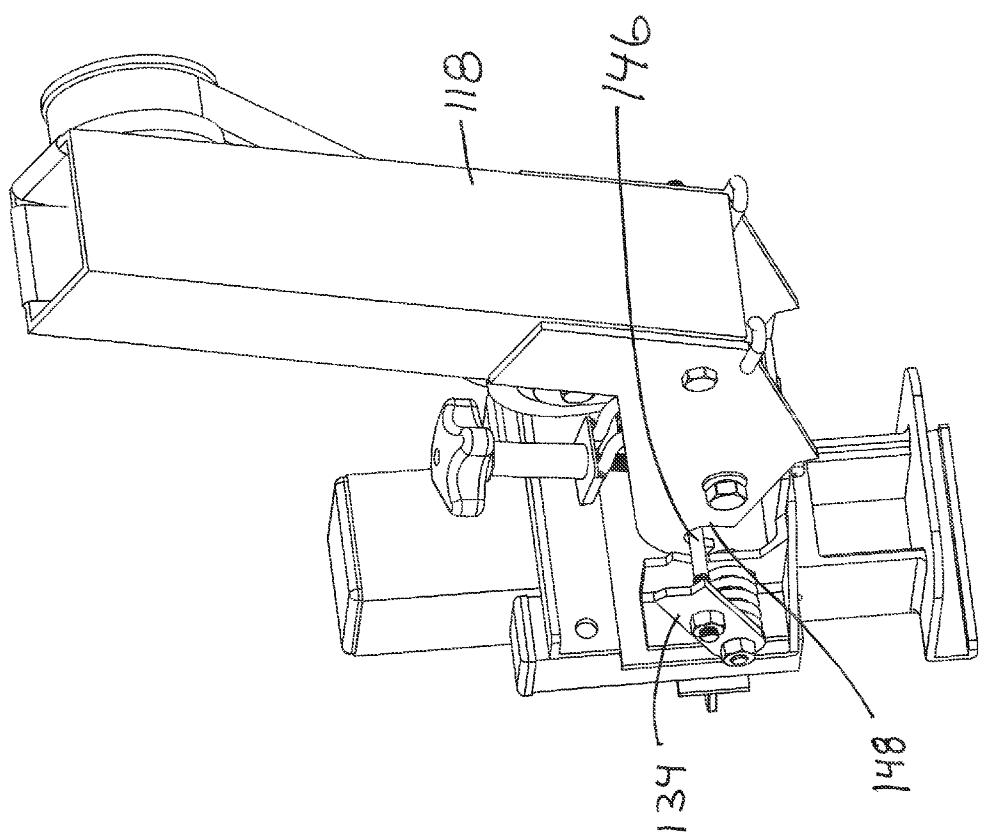
FIG. 27 is an exploded perspective view of a second embodiment according to the present invention.
Figure 28:
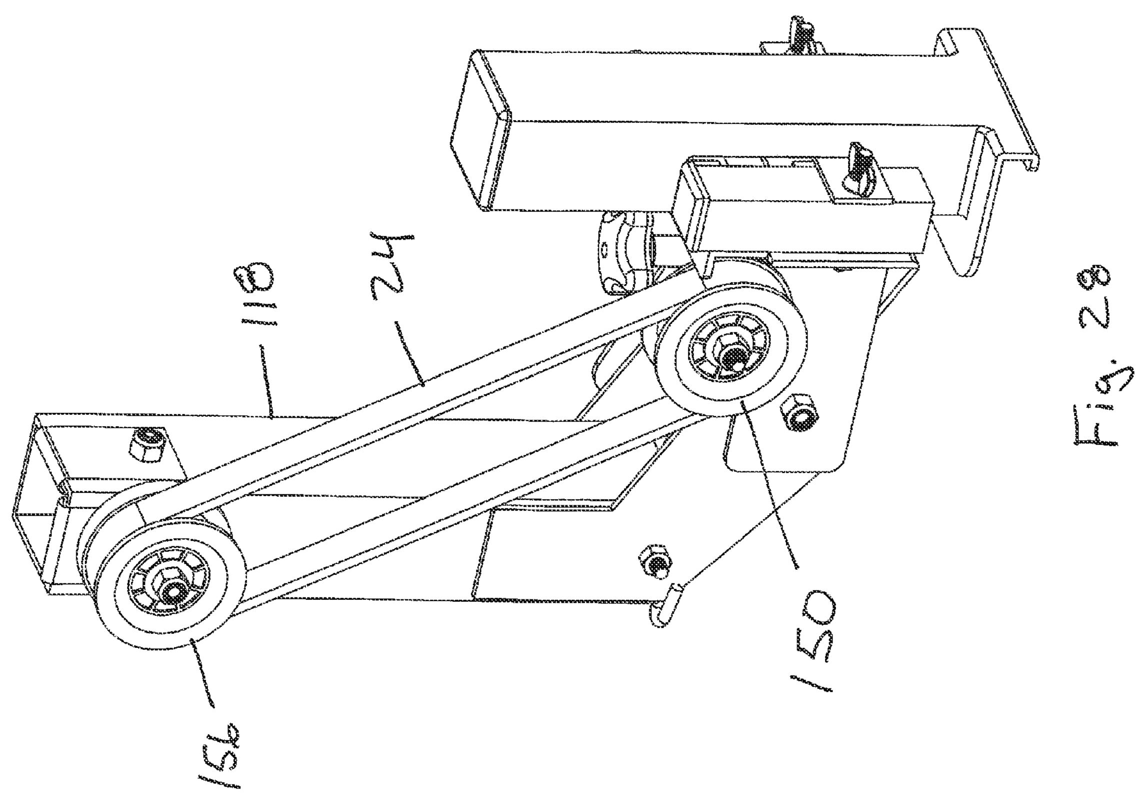
FIG. 28 is a perspective view of a second embodiment according to the present invention.

FIGS. 20-22, 24 and 27 show a lock lever 134. The lock lever 134 includes a lever bolt hole 136 at the end of the lock lever 134 and lock bolt hole 138 along the length of the lock lever 134. A lever bolt 140 extends outward from the lever bolt hole 136 of the first base arm 104. A coiled spring 142 is installed over the lever bolt 140. The lock lever 134 is installed on the lever bolt 140 using the lever bolt hole 136 of the lock lever 134. The lock lever 134 is secured using a nut 144. A lock bolt 146 extends from the lock bolt hole 138 towards and into the lock bolt hole 114 of the first base arm 104. The coil spring 142 biases the lock bolt 146 into the lock bolt hole 112 of the first base arm 104. When the lock lever 134 is pulled away from the first base arm 104, the lock bolt 146 is pulled away from the lock bolt hole 112 of the first base arm 104. FIG. 27 shows the function of the lock lever 134. The rod receiver arm 120 next to the first base arm 104 includes a bolt cutout 148. The lock bolt 146 engages the bolt cutout 148 when rod receiver 118 is pulled forward. When the lock bolt 146 engages the bolt cutout 148, the rod receiver 118 is in a lock position and can not pivot about the axle bolt 34. Pulling the lock lever 134 away from the first base arm 104 disengages the lock bolt 146 from the bolt cutout 148 and allows the rod receiver 118 to spring rearward. The lock bolt 146 rests against the rod receiver arm 120 and the rod receiver arm 120 can rotate as needed when fishing.

Figure 29:
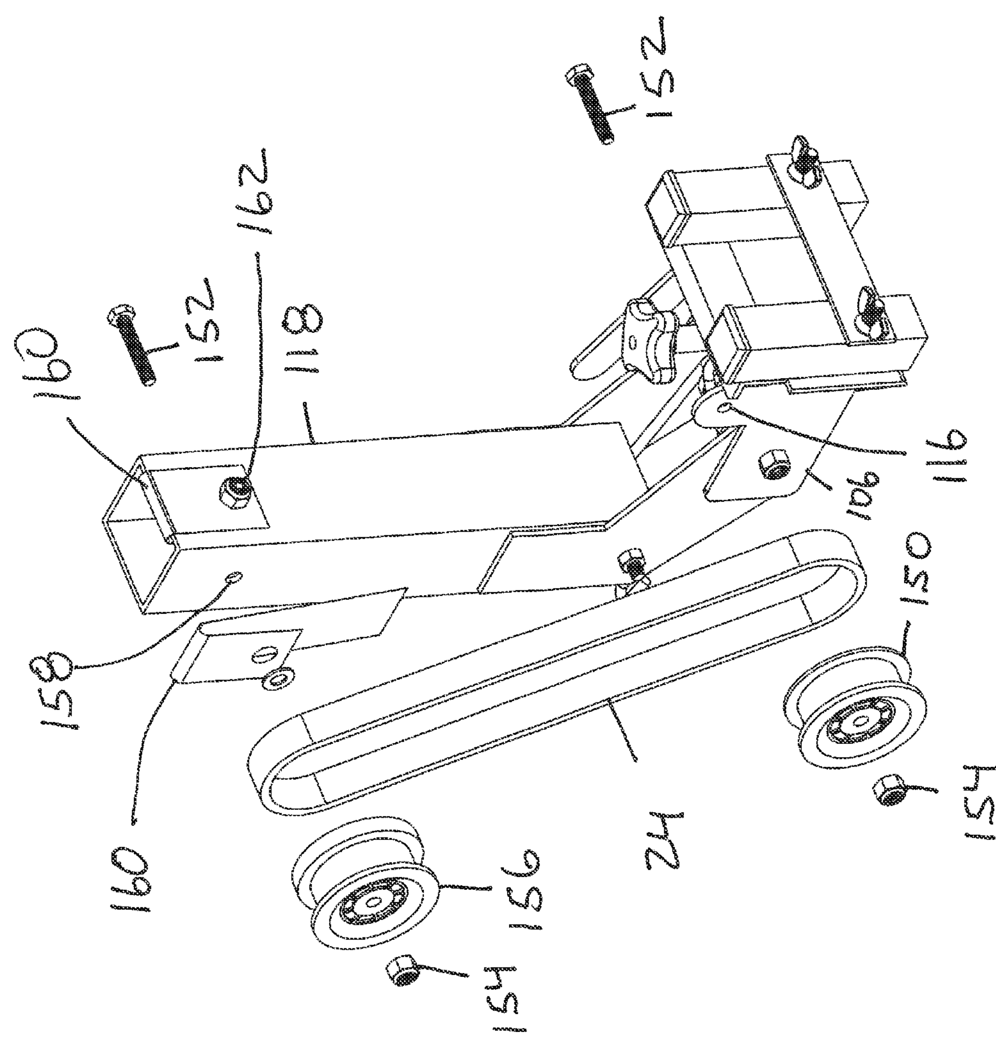
FIG. 29 is a perspective view of a second embodiment according to the present invention.
Figure 30:
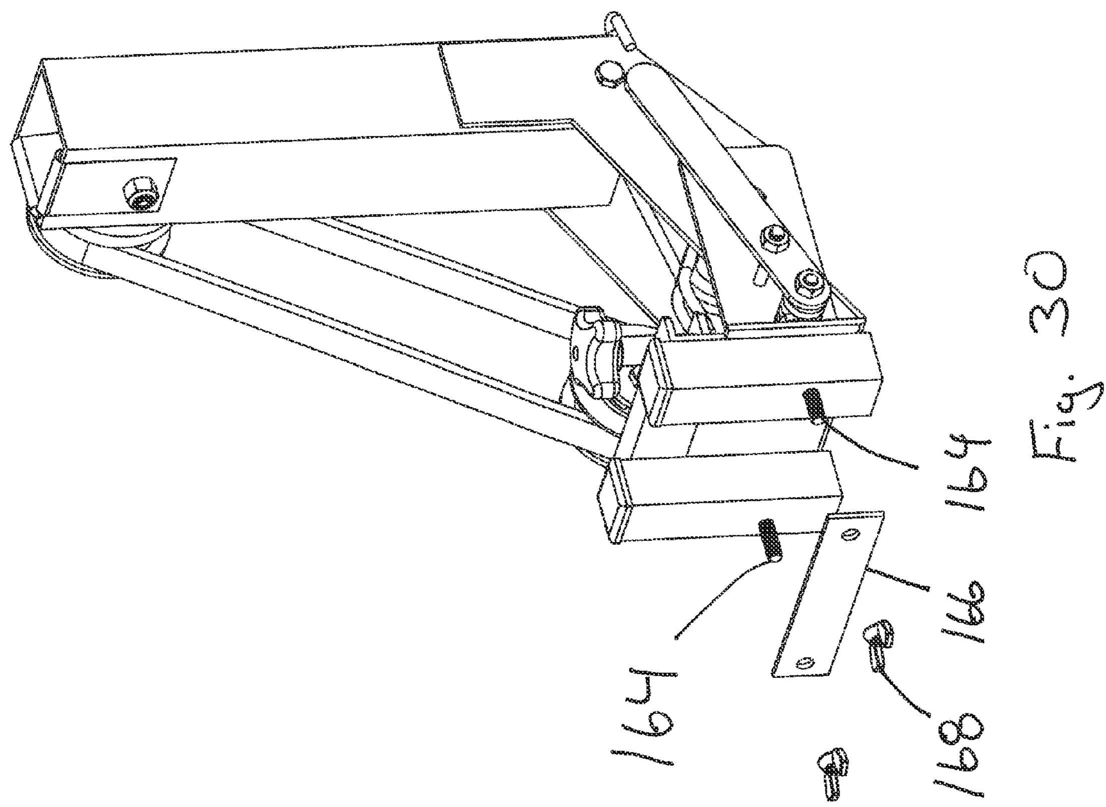
FIG. 30 is an exploded perspective view of a second embodiment according to the present invention.
Figure 31:
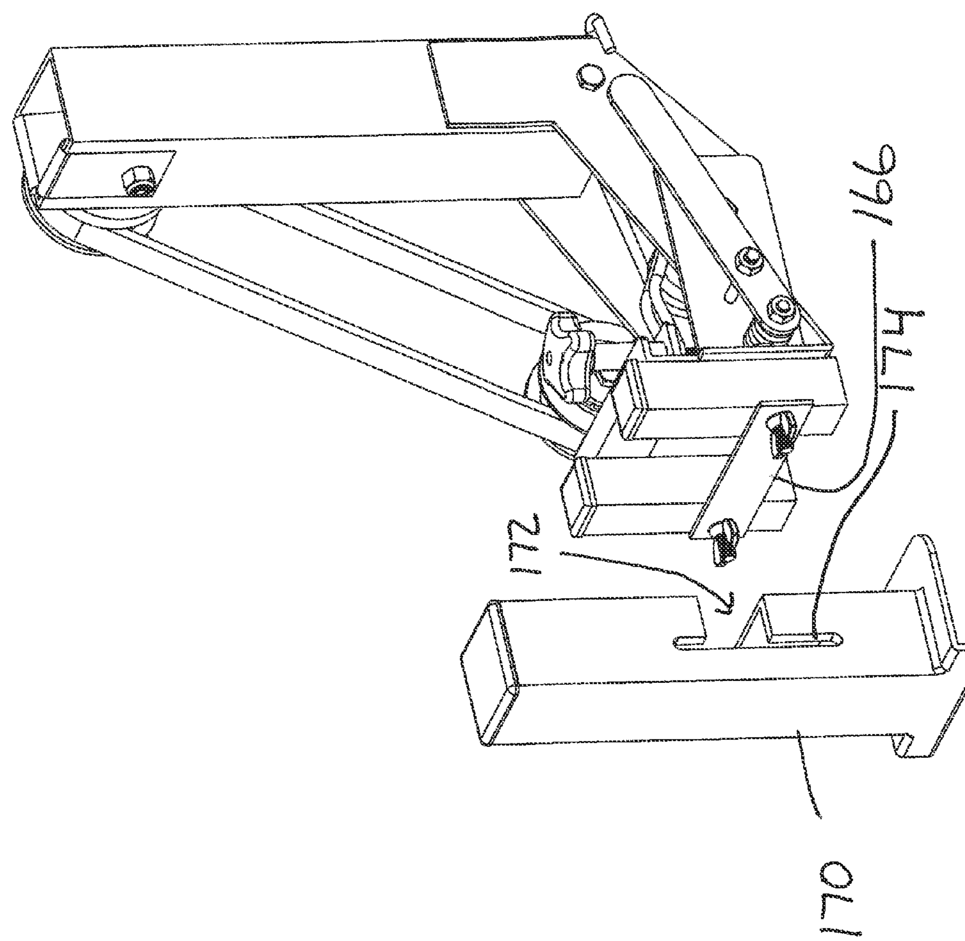
FIG. 31 is an exploded perspective view of a second embodiment according to the present invention.

FIG. 29 shows the use of only two pulleys with the elastic band 24, where the elastic band 24 acts as a second spring. A first pulley 150 is mounted to the second base arm 106 using a pulley bolt 152, nut 154 and the pulley bolt hole 116 of the second base arm 106. A second pulley 156 is mounted to the rod receiver 118 using a pulley bolt 152, nut 154 and the pulley bolt hole 158 of the rod receiver 118. FIG. 29 shows the use of plastic inserts 160 within the rod receiver 118 to allow easy insertion of the rod holder 68 used in the first embodiment, so the rod holder 68 does not rub on the bolt heads of pulley bolt 152. One plastic insert is secured by the pulley bolt 152, while the other uses its own bolt nut combination 162. FIGS. 28-31 show another method of mounting the fishing rod holder. Mounting bolt holes 110 of the spring base 102 and columns 98 allow insertion of back plate bolts 164. FIGS. 30-31 show a back plate 166 which attaches to the back of the columns 98 using the back plate bolts 164 and wing nuts 168. FIG. 31 shows a base post 170 which includes an insert slot 172 and a down slot 174. The back plate 166 is inserted into the insert slot 172 and allowed to slide down in the down slot 174. The fishing rod holder is held in place by the down slot 174 and back plate 166 combination. The base post 170 can be attached to a boat or other structures.

In both embodiments, the strength of resistance of the elastic band can be chosen by the user based on the user particular preference. While different embodiments of the invention have been described in detail herein, it will be appreciated by those skilled in the art that various modification and alternatives to embodiments could be developed in light of the overall teachings of the disclosure. Accordingly, the particular arrangements are illustrated only and are not limiting as to the scope of the invention that is to be given the full breadth of any and all equivalents thereof.

I claim:

1. A fishing rod holder comprising:

a spring base, said spring base being mountable to a secure mount;

a rod receiver, said rod receiver including a top and bottom, said rod receiver including an open area within said rod receiver at said top to receive a fishing rod;

at least one rod receiver arm connecting said rod receiver to said spring base, wherein said rod receiver is connected by said at least one rod receiver arm to said spring base such that said rod receiver can pivot between a first direction and a second direction in relation to where said rod receiver is connected to said at least one rod receiver arm at said spring base to provide motion during fishing;

a first spring mounted between said spring base and said bottom of said rod receiver to apply upward pressure to said bottom of said rod receiver in said second direction and provide resistance to movement of said rod receiver in said first direction; and a second spring connected between said top of said rod receiver and said spring base to hold said top of said rod receiver in tension and provide resistance to movement of said rod receiver in said first direction during reeling in a fish as the fish fights while hooked to simulate a user's hand movement, wherein said second spring is an elastic band; further including, a base pulley attached to said spring base and a receiver pulley attached to said rod receiver near said top and wherein said elastic band mounts about said base pulley and said receiver pulley.

2. The fishing rod holder of claim 1, further including a rod holder which fits into said rod receiver, said rod holder including an open space to receive a fishing rod, said rod holder including at least one cutout to allow proper fitting of the fishing rod and any parts attached to the fishing rod.

3. The fishing rod holder of claim 1, wherein said first spring includes hardware to adjust the resistance on said rod receiver.

4. The fishing rod holder of claim 1, wherein said first spring includes hardware to adjust the resistance on said bottom of said rod receiver.

5. The fishing rod holder of claim 1, wherein said first spring includes a loop attached to said spring base, wherein said loop includes two ends extending into two sets of coils, wherein two spring legs extend out from said coils and come against said rod receiver to provide resistance.

6. The fishing rod holder of claim 1, further including a third point which stretches said elastic band.

7. The fishing rod holder of claim 1, further including a third point which stretches said elastic band in addition to two points at said rod receiver and said spring base.

8. The fishing rod holder of claim 1, further including a locking device to retain said rod receiver in a lock position so that said rod receiver cannot pivot.

9. A fishing rod holder comprising:

a spring base, said spring base being mountable to a secure mount;

a rod receiver, said rod receiver including a top and bottom, said rod receiver including an open area within said rod receiver at said top to receive a fishing rod;

at least one rod receiver arm connecting said rod receiver to said spring base, wherein said rod receiver is connected by said at least one rod receiver to said spring base such that said rod receiver can pivot to provide motion during fishing;

a first spring mounted between said spring base and said rod receiver to provide resistance to movement of said rod receiver;

wherein said first spring includes a loop attached to said spring base, wherein said loop includes two ends extending into two sets of coils, wherein two spring legs extend out from said coils and come against said rod receiver to provide resistance;

further including an axle through both sets of said coils of said spring, wherein said rod receiver pivots about a center of said axle;

wherein said loop of said spring is attached to said spring base by a loop bolt and secured by a nut, wherein the tension of said spring can be adjusted by positioning of said nut on said loop bolt.

10. The fishing rod holder of claim 5, further including an axle through both sets of said coils of said spring, wherein said rod receiver pivots about a center of said axle.

11. The fishing rod holder of claim 10, wherein said loop of said spring is attached to said spring base by a loop bolt and secured by a nut, wherein the tension of said spring can be adjusted by positioning of said nut on said loop bolt.

12. The fishing rod holder of claim 8, where said locking device is a lever attached to said spring base, said lever including a locking bolt which engages said at least one rod receiver arm to retain said rod receiver in position.

* * * * *